US012696310B2

(12) United States Patent
Cui et al.

(10) Patent No.: US 12,696,310 B2
(45) Date of Patent: Jul. 28, 2026

(54) ELECTRONIC DEVICE FOR USE IN RADIO COMMUNICATION, METHOD, AND COMPUTER-READABLE STORAGE MEDIUM INCLUDING AN ADJUSTMENT OF CONTENTION WINDOW SIZE

(71) Applicant: Sony Group Corporation, Tokyo (JP)

(72) Inventors: Qimei Cui, Beijing (CN); Jing Jia, Beijing (CN); Tao Cui, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 325 days.

(21) Appl. No.: 17/917,575

(22) PCT Filed: May 14, 2021

(86) PCT No.: PCT/CN2021/093732
§ 371 (c)(1),
(2) Date: Oct. 7, 2022

(87) PCT Pub. No.: WO2021/233212
PCT Pub. Date: Nov. 25, 2021

(65) Prior Publication Data
US 2023/0180289 A1 Jun. 8, 2023

(30) Foreign Application Priority Data

May 21, 2020 (CN) .......................... 202010436147.0

(51) Int. Cl.
*H04W 74/0808* (2024.01)
*H04L 1/1607* (2023.01)
(Continued)

(52) U.S. Cl.
CPC ....... *H04W 74/0808* (2013.01); *H04L 1/1607* (2013.01); *H04L 1/1812* (2013.01); *H04L 5/0055* (2013.01)

(58) Field of Classification Search
CPC ............ H04W 74/0808; H04L 1/1607; H04L 1/1614; H04L 1/1621; H04L 1/1628;
(Continued)

(56) References Cited

U.S. PATENT DOCUMENTS

2018/0343205 A1 11/2018 Lei
2020/0154415 A1 5/2020 Oh
(Continued)

FOREIGN PATENT DOCUMENTS

CN 107580801 A 1/2018
CN 108370533 A 8/2018
(Continued)

OTHER PUBLICATIONS

International Search Report and Written Opinion mailed on Aug. 13, 2021, received for PCT Application PCT/CN2021/093732, filed on May 14, 2021, 9 pages including English Translation.
(Continued)

*Primary Examiner* — Brian T Le
(74) *Attorney, Agent, or Firm* — XSENSUS LLP

(57) ABSTRACT

Provided in the present disclosure are an electronic device for use in radio communication, a method, and a computer-readable storage medium. The electronic device for use in radio communication comprises a processing circuit. The processing circuit is configured to: acquire a hybrid automatic repeat request (HARQ) feedback value of transmission data transmitted thereby; and adjust, on the basis of the HARQ feedback value, a contention window size (CWS) for carrier listening before the next data transmission.

16 Claims, 12 Drawing Sheets

(51) Int. Cl.
H04L 1/1812 (2023.01)
H04L 5/00 (2006.01)

(58) Field of Classification Search
CPC ... H04L 1/1635; H04L 1/1812; H04L 1/1861;
H04L 5/0055
See application file for complete search history.

(56) References Cited

U.S. PATENT DOCUMENTS

| | | | | |
|---|---|---|---|---|
| 2020/0205199 A1* | 6/2020 | Newman | ........... | H04W 74/0816 |
| 2022/0312481 A1* | 9/2022 | Talarico | ............ | H04W 74/0866 |

FOREIGN PATENT DOCUMENTS

| | | | |
|---|---|---|---|
| CN | 110166182 A | 8/2019 |
| CN | 110167161 A | 8/2019 |
| CN | 110958711 A | 4/2020 |
| EP | 3337277 A1 | 7/2022 |
| WO | 2019/156542 A1 | 8/2019 |
| WO | WO-2020061583 A1 | 3/2020 |

OTHER PUBLICATIONS

3GPP, "Physical layer procedures for shared spectrum channel access (Release 16)", 3GPP TS 37.213 V16.0.0, Dec. 2019, pp. 1-25.

* cited by examiner

Electronic apparatus 100

Other apparatus

Electronic apparatus 100

Other apparatus

| A% | Channel access priority p | Value set of CWS |
|---|---|---|
| 10% | 1 | {3,7} |
| 50% | 2 | {7,15} |
| 75% | 3 | {15,31,63} |
| 100% | 4 | {15,31,63,127,255,511,1023} |

Start — S1002

Acquire HARQ feedback values
of transmitted transmission data — S1004

Adjust a contention window size for
carrier sensing performed before next
data transmission based on the HARQ
feedback values — S1006

End — S1008

ELECTRONIC DEVICE FOR USE IN RADIO COMMUNICATION, METHOD, AND COMPUTER-READABLE STORAGE MEDIUM INCLUDING AN ADJUSTMENT OF CONTENTION WINDOW SIZE

CROSS-REFERENCE TO RELATED APPLICATIONS

The present application is based on PCT filing PCT/CN2021/093732, filed May 14, 2021, which claims priority to Chinese Patent Application No. 202010436147.0, titled "ELECTRONIC DEVICE FOR USE IN RADIO COMMUNICATION, METHOD, AND COMPUTER-READABLE STORAGE MEDIUM", filed on May 21, 2020 with the China National Intellectual Property Administration, the entire contents of each are incorporated herein by reference in its entirety.

FIELD

The present disclosure relates to the technical field of wireless communications, and in particular to adjustment of a contention window size. More particularly, the present disclosure relates to an electronic apparatus and method for wireless communications for adjusting a contention window size, and a computer-readable storage medium.

BACKGROUND

In order to meet a huge business demand, a 5G communication system is desired to operate on resources from a low-frequency band to a high-frequency band about 100 G, including authorized frequency bands and unauthorized frequency bands. The unauthorized frequency hands mainly include a 5 GHz frequency band and a 60 GHz frequency band. A 5G system operating in the unauthorized frequency band is referred to as NR-U (unauthorized spectrum access based on NR (5G air interface)).

ETSI (European Telecommunications Standardization Association) proposed to use class 3 CWS (contention window size) adjustment in 60 GHz LBT (listen before talk) in 2014. However, EDCA (enhanced distributed channel access) in 802.11 provides four different access priorities (for example, class 4 LBT) using eight different user priorities to transmit traffic at 60 GHz in 2016. In addition, an NR-U channel access mechanism is defined in a non-patent document 1. Compared with the solution proposed by ETSI, channel access of wife in 60 GHz is slightly extended, and the CWS adjustment in 60 GHz NR-U is not specified. Therefore, in order to coexist fairly with will in the future, it is required to further consider the CWS adjustment of NR-U.

REFERENCE LIST

Non-patent document 1: 3GPP TS 37.2130(V16.0.0), 2019.12

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The apparatus includes a processing circuit. The processing circuit is configured to: acquire hybrid automatic repeat request, HARQ, feedback values of is transmitted transmission data; and adjust, based on the HARQ feedback values, a contention window size CWS for carrier sensing performed before next data transmission.

According to another aspect of the present disclosure, a method for wireless communications is provided. The method includes: acquiring hybrid automatic repeat request HARQ feedback values of transmitted transmission data; and adjusting, based on the HARQ feedback values, a contention window size CWS for carrier sensing performed before next data transmission.

According to other aspects of the present disclosure, there are further provided computer program codes and computer program products for implementing the methods for wireless communications above, and a computer readable storage medium having recorded thereon the computer program codes for implementing the methods for wireless communications described above.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings:

FIG. 8 is a diagram showing an example of correspondence between block error rates and sets of values of a contention window size;

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

The embodiments of the present disclosure are described in detail below in conjunction with the drawings.

Figure 1:
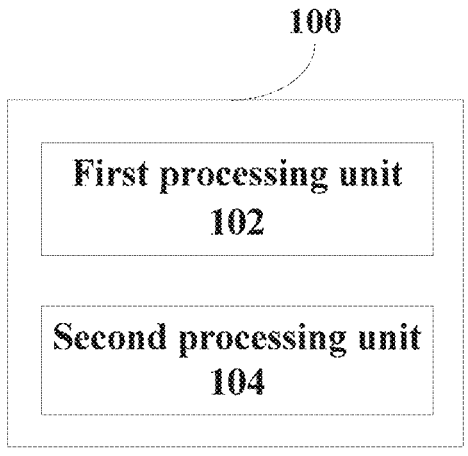
FIG. 1 is a block diagram showing functional modules of an electronic apparatus for wireless communications according to an embodiment of the present disclosure.

FIG. 1 is a block diagram showing functional modules of an electronic apparatus 100 for wireless communications according to an embodiment of the present disclosure. As shown in FIG. 1, the electronic apparatus 100 includes a first processing unit 102 and a second processing unit 104. The first processing unit 102 may be configured to acquire hybrid automatic repeat request (HARQ) feedback values of transmitted transmission data. The second processing unit 104 may be configured to adjust, based on the HARQ feedback values, a contention window size (CWS) for carrier sensing performed before next data transmission.

The first processing unit 102 and the second processing unit 104 may be implemented by one or more processing circuits. The processing circuits may be implemented as, for example, a chip.

The electronic apparatus 100 may be arranged on the base station side or communicably connected to the base station. Here it should be further pointed out that the electronic apparatus 100 may be implemented at a chip level or an apparatus level. For example, the electronic apparatus 100 may function as a base station itself and further include external apparatuses such as a memory and a transceiver (which are not shown in the drawings). The memory may be configured to store programs to be executed and related data information required for the base station to implement various functions. The transceiver may include one or more communication interfaces to support communications with various apparatuses (for example, user equipment, other base station or the like). Implementations of the transceiver are not limited herein.

For example, the transmission data may include only one data group and the electronic apparatus 100 may transmit the only one data group within one channel occupation time (COT). In this case, acquiring the HARQ feedback values of the transmitted transmission data refers to that the electronic apparatus 100 acquires HARQ feedback values of a data group transmitted in a current COT. The next data transmission performed by the electronic apparatus 100 refers to transmission of a data group in a next COT. For example, the transmission data may include multiple data groups and the electronic apparatus 100 may transmit the multiple data groups within a COT. In this case, acquiring the HARQ feedback values of the transmitted transmission data may refers to that the electronic apparatus 100 acquires the HARQ feedback values of a first data group transmitted within the current COT. The next data transmission performed by the electronic apparatus 100 refers to transmission of other data group than the first data group among the multiple data groups within the current COT.

Hereinafter, the HARQ feedback values are sometimes referred to as HARQ-ACK, where ACK is the abbreviation of acknowledgement.

The electronic apparatus 100 according to an embodiment of the present disclosure is capable of adjusting a contention window size based on the obtained HARQ feedback values.

As an example, the first processing unit 102 may be configured to transmit transmission data on an unauthorized frequency band. The unauthorized frequency band mainly includes a 5 GHz frequency band and a 60 GHz frequency band. In the following, unless otherwise specified, the unauthorized frequency band is described by taking the 60 GHz frequency band as an example. Those skilled in the art can understand that the description of the 60 GHz frequency band is applicable to the description of the 5 GHz frequency band.

As an example, the second processing unit 104 may be configured to adjust the CWS further based on a determination result obtained by determining whether there are hidden node(s).

The hidden node may also be referred to as a hidden terminal or a hidden end. The hidden node refers to a node that is within the coverage of a receiving node but outside the coverage of a transmitting node in a wireless network. The hidden node may transmit data packet to a same receiving node due to unknown of transmission of the transmitting node, resulting in collision of data packets at the receiving node. After the collision, the transmitting node is required to retransmit the collision packets, which reduces utilization of the channel.

Data interference (data collision) may be caused by the conflict that multiple apparatuses occupy a channel at the same time. If the channel is not allocated to multiple apparatuses at the same time and there is still interference, the interference may be caused by presence of the hidden node(s).

In the 60 GHz frequency band, HARQ-ACK feedback has a great impact on CWS adjustment in class 4 LBT due to the presence of a hidden node. For example, in the 60 GHz frequency band, the problem of hidden node is serious, resulting in that a user equipment end decodes wrongly and continuously feeds NACK (negative acknowledgement) back, so that the CWS at the base station end always increases. A too large CWS is not conducive to access to an NR-U channel of the 60 GHz frequency band.

The electronic apparatus 100 according to an embodiment of the present disclosure is capable of adjusting the CWS based on a determination result obtained by determining whether there are hidden node(s), so as to the impact of the hidden node on CWS adjustment.

As an example, the second processing unit 104 may be configured to determine, based on the HARQ feedback values of at least part of non-reference data transmitted within a COT, whether there is the hidden node. The non-reference data is data transmitted within each duration in the COT other than a first duration serving as a reference duration.

Assuming that the channel occupation includes a unicast physical downlink shared channel (PDSCH), a first duration of a base station (i.e., a gNB) included in the channel occupation of a single unicast PDSCH is the reference duration.

Figure 2:
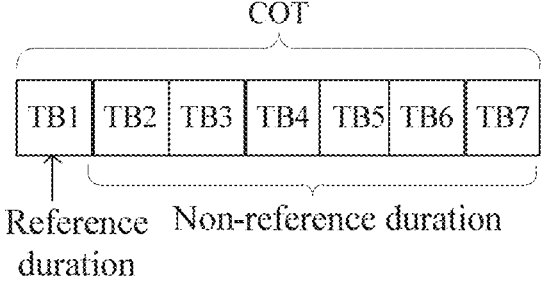
FIG. 2 is a diagram showing an example of a channel occupation time.

FIG. 2 is a diagram showing an example of a channel occupation time. As shown in in FIG. 2, the first duration in the COT is the reference duration, and the duration in the COT other than the reference duration is referred to as non-reference duration. Hereinafter, the data transmitted during the reference duration is referred to as reference data, and the data transmitted during the non-reference duration is referred to as non-reference data. Exemplarily rather than restrictively, the COT shown in FIG. 2 includes six non-reference durations. Those skilled in the art can know that the number of non-reference durations may be selected according to experience or actual conditions.

The electronic apparatus 100 may transmit data in unit of a transmission block or a code block. In FIG. 2, for simplicity, it is assumed that data is transmitted in unit of a transmission block. As shown in FIG. 2, the reference data TB1 is transmitted during the reference duration, and the non-reference data from TB2-TB7 are transmitted during the non-reference duration.

In the conventional technology, although the electronic apparatus also obtains the HARQ feedback values of the non-reference data, the electronic apparatus does not determine whether there is a hidden node based on the HARQ feedback values of the non-reference data to adjust the CWS. However, the electronic apparatus 100 according to the embodiments of the present disclosure determines whether there is a hidden node based on the HARQ feedback values of the non-reference data to adjust the CWS, thereby further reducing the impact of the hidden node on the CWS adjustment. In addition, compared with the conventional technology, additional signal burden is not generated.

Figure 3:
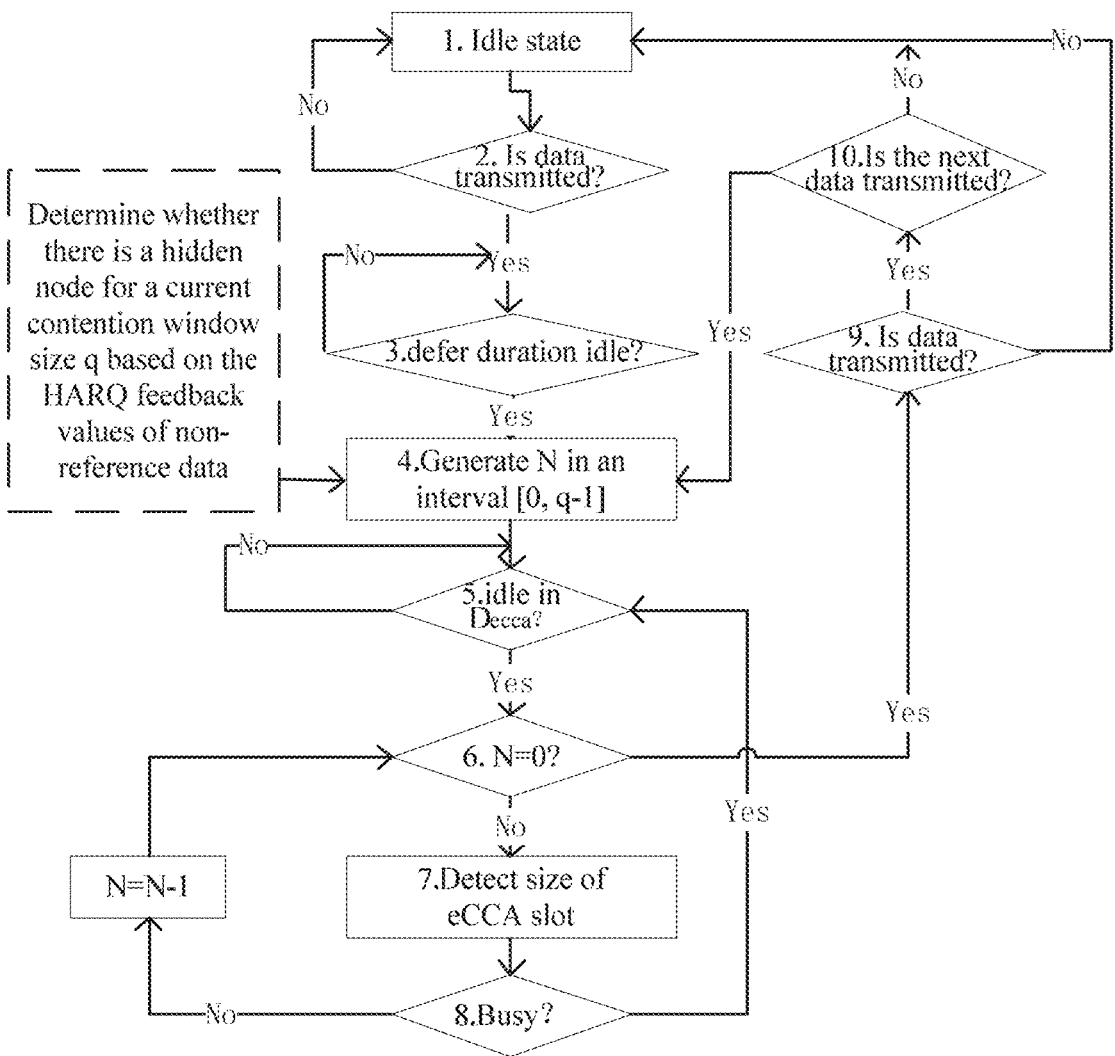
FIG. 3 is a schematic flowchart showing that an electronic apparatus according to an embodiment of the present disclosure determines whether there is a hidden node based on HARQ feedback values of non-reference data to adjust a CWS.

FIG. 3 is a schematic flowchart showing that the electronic apparatus 100 according to an embodiment of the present disclosure determines whether there is a hidden node based on the HARQ feedback values of the non-reference data to adjust the CWS.

As shown in FIG. 3, in step 1, it is in an idle state in a case of no data transmission. In step 2, it is determined whether to transmit data, that is, whether to perform data detection. In a case that it is determined not to transmit data in step 2, step 1 is returned. In a case that it is determined to transmit data in step 2, step 3 is performed. In step 3, it is defected whether the defer duration is idle. In a case of determining that the defer duration is idle in step 3, step 4 is performed. Different access priorities have different size of CWS (i.e. different value sets of CWS). A contention window size of a channel access priority p (for example, $p \in \{1,2,3,4\}$) may be represented by CWp. Different access priorities p respectively correspond to different value sets of CWp with numbers and sizes. Assuming that a current contention window size in the value set of CWp of the access priority p is q, in step 4, a count value N (also referred to as a back-off window size) of a random back-off counter is generated in an interval [0, q-1]. As shown in the dotted box on the left of step 4, it is determined whether there is the hidden node based on the HARQ feedback values of the non-reference data to adjust the current contention window size q (for example, the current contention window size q in the value set of CWp is maintained, or the current contention window size q is updated to a value after the current contention window size in the value set of CWp) to affect a value range of N in step 4. In step 5, it is detected whether a channel is idle within Decca (Decca is a size of a detection slot). In step 6, it is determined whether N is equal to 0. In a case of determining that N is not equal to 0 in step 6, it is detected a size of an eCCA (extended clearance channel evaluation) slot of the channel in step 7. In a case of determining that the channel is busy in step 8, step 5 is performed for detection of Decca. In a case of determining that the channel is not busy in step 8, it makes N=N−1, and data transmission is not performed until N is reduced to 0. In a case of determining that N is equal to 0 in step 6, step 9 is performed. In step 9, it is determined whether to transmit data. In a case of determining not to transmit data in step 9, step 1 is returned. In a case of determining to transmit data in step 9, step 10 is performed. In step 10, it is determined whether to transmit next data. In a case of determining not to transmit the next data in step 10, step 1 is returned. In a case of determining to transmit the next data in step 10, step 4 is performed.

In the following, for simplicity, the CWp in the channel access priority p is sometimes represented by CWS. Maintaining CWS refers to maintaining a current contention window size. Updating CWS refers to updating the current contention window size to a value after the current contention window size in the value set of CWp in the access priority p. For example, if the value set of CWp in the access priority p is {15, 31, 63} and the current contention window size is 31, the updating CWS refers to updating the current contention window size to 63. Hereinafter, the channel access priority p is sometimes referred to as access priority p.

As an example, the second processing unit 104 may be configured to determine, in a case that the HARQ feedback values of all non-reference data transmitted in the COT are NACK, that there is a hidden node, and otherwise determine that there is no hidden node. In case of severe interference, all ACK/NACK feedback of the non-reference duration are NACK. Therefore, a case where the HARQ feedback values of all non-reference data transmitted in the COT are NACK is a serious interference situation.

As an example, the second processing unit 104 may be configured to determine, in a case that a ratio of the number of HARQ feedback values that are NACK among all HARQ feedback values of the non-reference data transmitted in the COT to a total number of all HARQ feedback values is greater than or equal to a predetermined ratio threshold, that there is a hidden node, and otherwise determine that there is no hidden node. For example, those skilled in the art may set the predetermined ratio threshold in advance according to experiences or application scenarios.

As an example, the second processing unit 104 may be configured to determine, in a case that HARQ feedback values of non-reference data first transmitted in time among the non-reference data transmitted in the COT are ACK, that there is no hidden node, and otherwise determine that there is a hidden node. For example, the non-reference data first transmitted in time may be TB2 shown in FIG. 2.

As an example, the second processing unit 104 may be configured to determine, in a case that HARQ feedback values of non-reference data last transmitted in time among the non-reference data transmitted in the COT are ACK, that there is no hidden node, and otherwise determine that there is a hidden node. For example, the non-reference data last transmitted in time may be TB7 shown in FIG. 2.

As an example, the second processing unit 104 may be configured to determine, in a case that there is at least one ACK in the HARQ feedback values of the non-reference data transmitted in the COT, that there is no hidden node, and otherwise determine that there is a hidden node.

As an example, the second processing unit 104 may further be configured to adjust the CWS based on the HARQ feedback values of the reference data. The reference data is data among the transmission data and transmitted within the reference duration in the COT.

For example, as shown in FIG. 2, the duration of transmitting TB1 in the COT is an example of the reference duration, and the data TB1 transmitted within the reference duration is an example of the reference data.

As an example, the second processing unit 104 may be configured to set the CWS to be a predetermined CWS minimum in a case that the HARQ feedback values of the reference data are ACK.

For example, the predetermined CWS minimum is a minimum CWmin in the value set of CWp in the access priority p. The minimum is determined in advance.

In the following FIG. 4 to FIG. 7, CCA represents a clearance channel evaluation, and a rectangular block filled with slashes indicates that data is transmitted within duration represented by the rectangular block. The clearance channel evaluation is well-known technology in the art, and is not repeated here.

Figure 4:
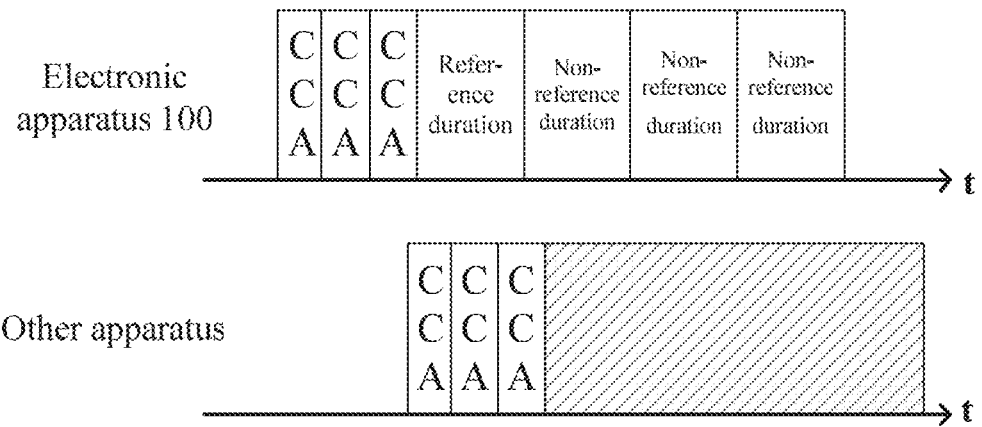
FIG. 4 shows a first example of time occupation of data transmission between an electronic apparatus according to an embodiment of the present disclosure and other apparatus.

FIG. 4 shows a first example of time occupation of data transmission between the electronic apparatus 100 according to an embodiment of the present disclosure and other apparatus.

As shown in FIG. 4, other apparatus only performs CCA without transmitting data within the reference duration of the electronic apparatus 100. Therefore, the HARQ feedback values of the reference data transmitted by the electronic apparatus 100 within the reference duration are ACK, and the electronic apparatus 100 may set the CWS to be a minimum in the value set of the CWp in the access priority p.

As an example, the second processing unit 104 may be configured to update the CWS in a case that the HARQ feedback values of the reference data are NACK and it is determined that there is no hidden node. For example, in the case that the HARQ feedback values of the reference data are NACK and it is determined that there is no hidden node, the electronic apparatus 100 considers that data interference is caused by conflict, so that the CWS is updated.

Figure 5:
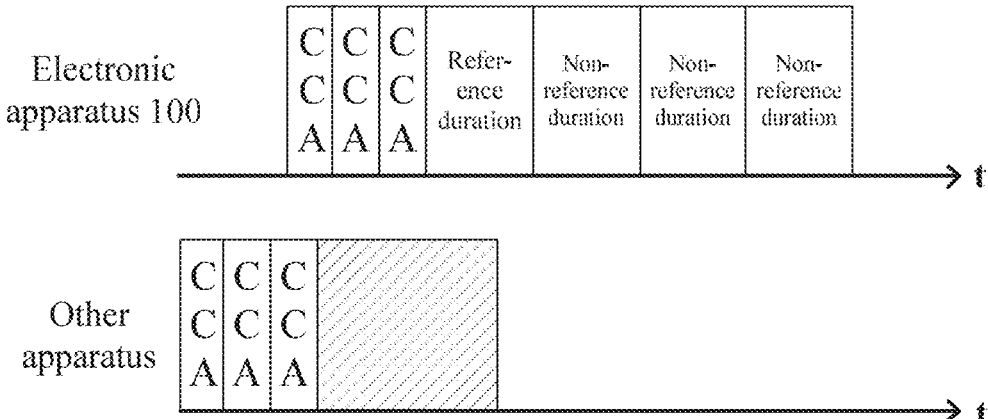
FIG. 5 shows a second example of time occupation of data transmission between an electronic apparatus according to an embodiment of the present disclosure and other apparatus.

FIG. 5 shows a second example of time occupation of data transmission between the electronic apparatus 100 according to an embodiment of the present disclosure and other apparatus.

As shown in FIG. 5, other apparatus also transmit data within the reference duration of the electronic apparatus 100. Therefore, the HARQ feedback values of the reference data transmitted by the electronic apparatus 100 within the reference duration are NACK. Other apparatus does not transmit data within the non-reference duration of the electronic apparatus 100, so that the HAM) feedback values of each non-reference data transmitted by the electronic apparatus 100 within the non-reference duration are ACK. Therefore, the electronic apparatus 100 determines that there is no hidden node. In the case shown in FIG. 5, the electronic apparatus 100 determines that there is no hidden node, so that it is considered that the data interference is caused by conflict, and the current contention window size is updated to a value after the current contention window size in the value set of CWp in the access priority p.

As an example, the second processing unit 104 may be configured to adjust, in a case that the HARQ feedback values of the reference data are NACK and it is determined that there is a hidden node, the CWS based on the number of times of maintaining the CWS at a predetermined CWS maximum.

For example, the predetermined CWS maximum is a maximum CWmax in the value set of CWp in the access priority p. The maximum is determined in advance.

in a case that the HARQ feedback values of the reference data are NACK and it is determined that there is a hidden node, it is required to further determine whether the data interference is caused by the hidden node or the conflict. The electronic apparatus 100 according to the embodiments of the present disclosure determines whether the data interference is caused by the hidden node or the conflict based on the number of times of maintaining the CWS at a predetermined CWS maximum.

Figure 6:
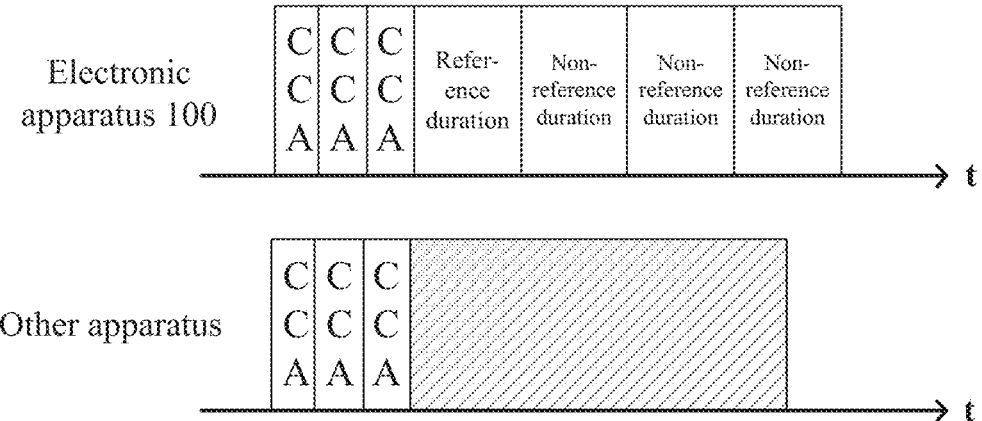
FIG. 6 shows a third example of time occupation of data transmission between an electronic apparatus according to an embodiment of the present disclosure and other apparatus.

FIG. 6 shows a third example of time occupation of data transmission between the electronic apparatus 100 according to an embodiment of the present disclosure and other apparatus.

Figure 7:
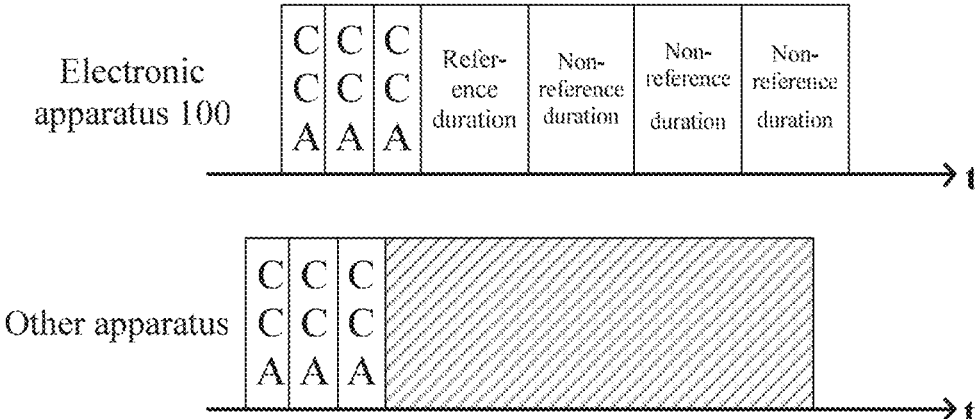
FIG. 7 shows a fourth example of time occupation of data transmission between an electronic apparatus according to an embodiment of the present disclosure and other apparatus.

FIG. 7 shows a fourth example of time occupation of data transmission between the electronic apparatus 100 according to an embodiment of the present disclosure and other apparatus.

As shown in FIG. 6 and FIG. 7, other apparatus also transmit data within the reference duration of the electronic apparatus 100. Therefore, the HARQ feedback values of the reference data transmitted by the electronic apparatus 100 within the reference duration are NACK. In addition, other apparatus also transmit data within the non-reference duration of the electronic apparatus 100. Therefore, the HARQ feedback values of each non-reference data transmitted by the electronic apparatus 100 within the non-reference duration are NACK. Therefore, the electronic apparatus 100 determines that there is a hidden node. For example, in a case Where the HARQ feedback values of the reference data are NACK and it is determined that there is a hidden node as shown in FIG. 6 and FIG. 7. The electronic apparatus 100 according to the embodiments of the present disclosure determines whether the data interference is caused by the hidden node or the conflict based on the number of times the CWS maintains a predetermined CWS maximum.

X is used to represent the number of times of maintaining the CWS at the predetermined CWS maximum, which may be used to accumulate the duration of maintaining the CWS at CWmax.

As an example, the second processing unit 104 may be configured to update the CWS in a case that the number of times X is less than or equal to a number of times threshold obtained based on a predetermined number of times of maintaining the CWS at the CWS maximum, and otherwise the CWS is maintained. In a case of maintaining the CWS at the CWS maximum for the predetermined number of times, the CWS is reset to be a predetermined CWS minimum.

For example, the electronic apparatus 100 determines, in a case that the number of times X is less than or equal to the number of times threshold, that the data interference is caused by the conflict, so that the CWS is updated. The electronic apparatus 100 determines, in a case that the number of times X is greater than the number of times threshold, that the data interference is caused by the hidden node, so that the CWS is maintained.

K is used to represent a predetermined number of times. As an example, the second processing unit 104 may be configured to select a predetermined number of times K for each channel access priority p. For example, the electronic apparatus 100 selects K from a set of $\{1, 2, \ldots, 8\}$ for each access priority $p \in \{1,2,3,4\}$. As described above, for example, the predetermined CWS minimum is the minimum CWmin in the value set of CWp in the access priority p, and the minimum is determined in advance. In a case of maintaining CWS at CWmax for the predetermined number of times K, the CWS is reset to be CWmin.

The number of times threshold is obtained based on a square of the predetermined number of times K.

For example, the number of times threshold may be a value obtained by rounding down $K^2/10$. Those skilled in the art may also think of other ways to obtain the number of times threshold based on the predetermined number of times, which is not repeated here.

It is assumed that existence time of the hidden node is longer than existence time of the conflict, which causes a faster increase of X of the hidden node.

For example, the electronic apparatus 100 sets K to be 7, the above number of times threshold is calculated to be 4 (a value obtained by performing rounding down on $7^2/10$). If the number times X of maintaining the CWS at CWmax is 3, since the number of times X is less than the number of times threshold 4, the electronic apparatus 100 determines that the data interference is caused by the conflict rather than the hidden node, so that the CWS is updated, that is, the current contention window size is updated to the value after the current contention window size in the value set of the CWp in the access priority p. In a case that X is greater than the number of times threshold, the current contention window size is maintained.

As an example, the second processing unit 104 may be configured to determine whether there is the hidden node based on the HARQ feedback values of reference data and information about a channel between the electronic apparatus and a user equipment (UE) received from the user equipment. The reference data is data transmitted within a first duration serving as a reference duration in a channel occupation time among the transmission data.

The electronic apparatus 100 according to the embodiments of the present disclosure can determine whether there is the hidden node to adjust the CWS based on the channel information, so as to further reduce the influence of the hidden node on the CWS adjustment.

As an example, the information of the channel is received together with the HARQ feedback values, or the information of the channel is received through the HARQ feedback values.

For example, the UE measures the channel, and transmits a measurement result and the HARQ feedback values to the electronic apparatus 100 or transmits the measurement result to the electronic apparatus 100 through the HARQ feedback values.

As an example, the information of the channel may be an energy detection threshold. $X_{thresh}$ is used to represent the energy detection threshold. Those skilled in the art may also think of other representations of the information of the channel other than the energy detection threshold, which is not repeated here.

As an example, the second processing unit 104 may be configured to determine that there is no hidden node and update the CWS in a case that the energy detection threshold $X_{thresh}$ is less than or equal to a predetermined energy detection threshold and the HARQ feedback values of the reference data are NACK. For example, updating the CWS refers to updating the current contention window size to the value after the current contention window size in the value set of CMp in the access priority p.

As an example, the second processing unit 104 may be configured to determine that there is the hidden node and maintain the CWS in a case that the energy detection threshold $X_{thresh}$ is greater than the predetermined energy detection threshold and the HARQ feedback values of the reference data are NACK. For example, maintaining CWS refers to maintaining the CWS at the current contention window size.

$X_{thresh,max}$ is used to represent a predetermined energy detection threshold. For example, the electronic apparatus 100 determines the predetermined energy detection threshold $X_{thresh,max}$ in advance.

For specific description of a table of the energy detection threshold $X_{thresh}$ and the predetermined energy detection threshold $X_{thresh,max}$, one may refer to non-patent document 1, which is not repeated here.

As an example, the second processing unit 104 may be configured to transmit the transmission data in unit of a code block, and the second processing unit 104 may be configured to acquire a first ratio and a second ratio, and determine whether there is the hidden node based on a change rate of the second ratio with respect to the first ratio, where the first ratio is a ratio of NACK in first HARQ feedback values that correspond to a case where the code block is initially transmitted, and the second ratio is a ratio of NACK in second HARQ feedback values that correspond to a case where the code block is retransmitted.

For example, Z represents the ratio of NACK in the HARQ feedback values.

In the non-patent document 1, in 4G communication, in a case that Z is greater than 80%, that is, a ratio of "NACK" in the HARQ-ACK feedback is greater than 80%, it is considered that transmission of data corresponding to the HARQ-ACK feedback by the base station fails. In 5G communication, in a case that for PDSCH with transmission based on a transmission block, at least one HARQ feedback is "ACK", or in a case that for PDSCH with transmission based on a code block, at least 10% of HARQ-ACK feedback is "ACK", it is considered that transmission of data corresponding to the HARQ-ACK feedback by the base station is successful.

The electronic apparatus 100 according to the embodiments of the present disclosure can determine whether there is the hidden node to adjust the CWS based on the above change rate, so as to further reduce the influence of the hidden node on the CWS adjustment.

For example, Z1 represents the first ratio. Z2 represents the second ratio. M % represents the change rate of the second ratio with respect to the first ratio.

As an example, the second processing unit 104 may be configured to determine that there is the hidden node and maintain the CWS in a case that the change rate M % is less than or equal to a predetermined change rate, and otherwise determine that there is no hidden node and update the CWS. For example, maintaining the CWS refers to maintaining the CWS at the current contention window size, and updating the CWS refers to updating the current contention window size to the value after the current contention window size in the value set of CWp in the access priority p.

For example, those skilled in the art may determine the predetermined change rate based on experiences or actual application scenarios. For example, the predetermined change rate may be 10%.

A represents an initially transmitted code block and A' represents a retransmitted code block. A and A' include the same data. When the code block A is retransmitted, other code blocks may not be transmitted together with the retransmitted code block A', or other code blocks may be transmitted together with the retransmitted code block A', B represents other code blocks. HARQ feedback values of the code block A may be the above first HARQ feedback values. In a case of not transmitting other code blocks together with the retransmitted code block A', the HARQ feedback values of the code block A' may be the above second HARQ feedback values. In a case of transmitting other code blocks B together with the retransmitted code block A', the HARQ feedback values of the code blocks A' and B may be the above second HARQ feedback values.

As an example, the second processing unit 104 may be configured to take, in a case that the first HARQ feedback values and the second HARQ feedback values are within a same COT, HARQ feedback values corresponding to the case where other code blocks are not transmitted together with the retransmitted code block when retransmitting the code block as the second HARQ feedback values. For example, the second processing unit 104 may take, in a case that the first HARQ feedback values and the second HARQ feedback values are within a same COT, the HARQ feedback values of the code block A' as the second HARQ feedback values.

As an example, the second processing unit 104 may be configured to take, in a case that the first HARQ feedback values and the second HARQ feedback values are within a same COT, HARQ feedback values corresponding to the case where other code blocks are transmitted together with the retransmitted code block when retransmitting the code block as the second HARQ feedback values. For example, the second processing unit 104 may take, in a case that the first HARQ feedback values and the second HARQ feedback values are within a same COT, the HARQ feedback values of the code blocks A' and B as the second HARQ feedback values.

As an example, the second processing unit 104 may be configured to take, in a case that the first HARQ feedback values and the second HARQ feedback values are not within a same COT, HARQ feedback values corresponding to the case where other code blocks are transmitted together with the retransmitted code block when retransmitting the code block as the second HARQ feedback values. For example, the second processing unit 104 may take, in a case that the first HARQ feedback values and the second HARQ feedback values are not within a same COT, the HARQ feedback values of the code blocks A' and B as the second HARQ feedback values.

As an example, the second processing unit 104 may be configured to determine the CWS based on a block error rate (BLER).

The electronic apparatus 100 according to the embodiments of the present disclosure can determine the CWS based on only the block error rate without the HARQ feedback values.

As an example, the second processing unit 104 may be configured to determine the CWS according to a predetermined correspondence between the block error rate and the value set of the CWS.

As an example, in the above correspondence, a great block error rate corresponds to a great CWS in a value set corresponding to the block error rate.

As an example, the value set corresponding to the block error rate is characterized by a channel access priority. A great block error rate corresponds to a low channel access priority.

As an example, CWS is randomly selected from the value set corresponding to the block error rate.

FIG. 8 is a diagram showing an example of correspondence between block error rates and values sets of the CWS.

in the Figure, A % represents the BLER. As shown in FIG. 8, the link adaptation with A % includes four levels, and A % corresponds to four channel access priorities p (in class 4 LBT, there are four access priorities p). For a user with a small A %, a high channel access priority is selected, and the CWS in the value set of CWS is small. On the contrary, for a user with a large A %, a low channel access priority is selected and the CWS in the value set of CWS is large. For example, in a case that A % is equal to 75%, the channel access priority is 3 and the current contention window size q is randomly selected from 15, 31 and 63. In addition, a back-off window N is selected in an interval [0, q-1], that is, the back-off window N is adaptively generated by a link level with a BLER represented by A %.

Figure 9:
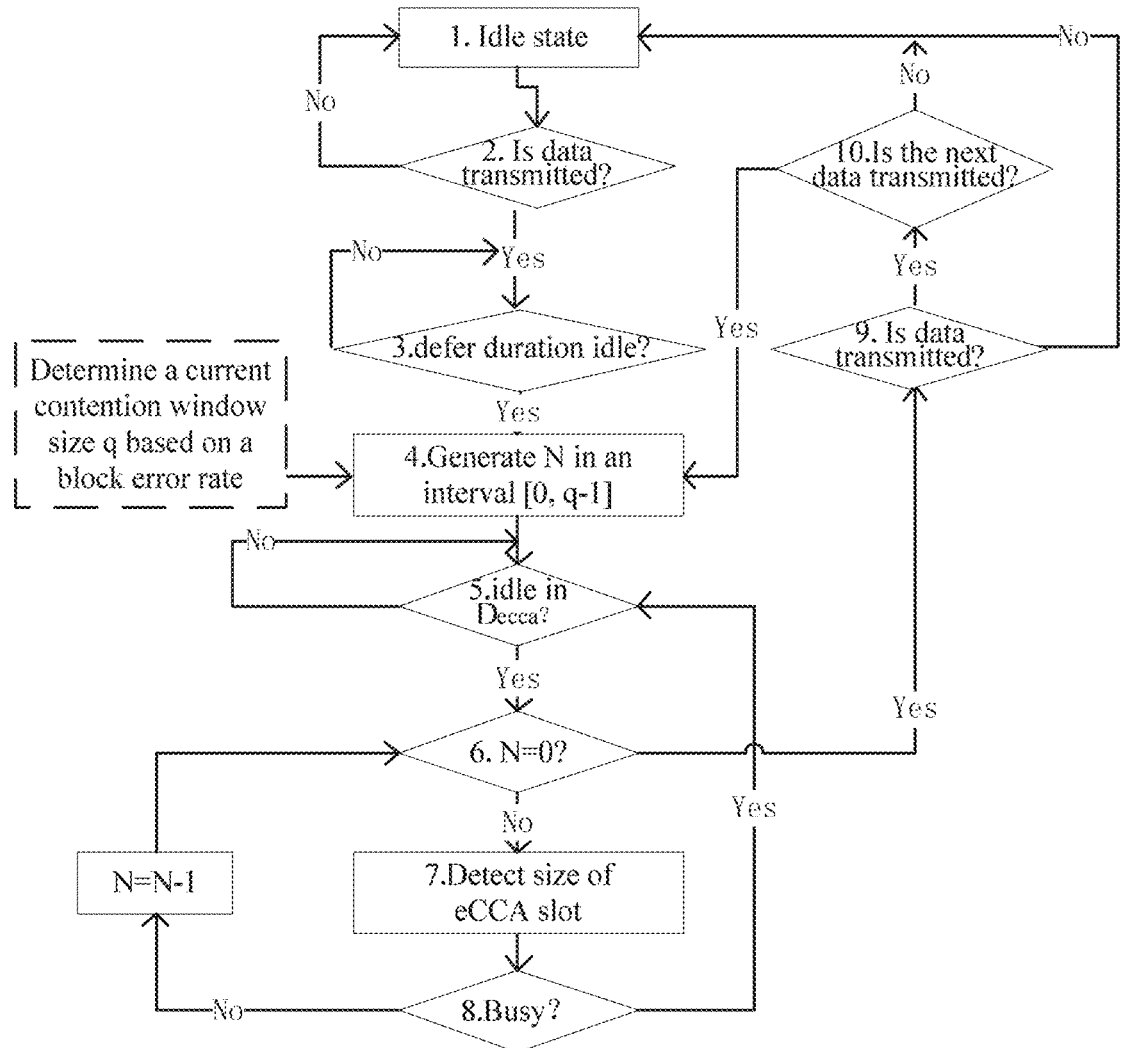
FIG. 9 is a schematic flowchart showing that an electronic apparatus according to an embodiment of the present disclosure determines a CWS based on a block error rate.

FIG. 9 is a schematic flowchart showing that the electronic apparatus 100 according to the embodiments of the present disclosure determines the CWS based on the block error rate.

FIG. 9 is different from FIG. 3 only in the dotted box. Steps 1 to 10 in FIG. 9 are the same as steps 1 to 10 in FIG. 3. In FIG. 9, as shown in the dotted box on the left side of step 4, the current contention window size q is determined based on the block error rate, thereby affecting a value range of N in step 4.

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 10:
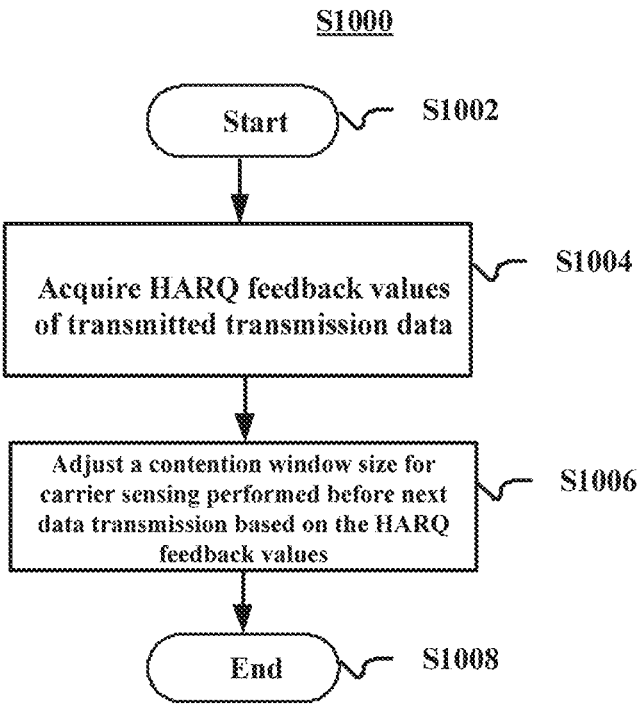
FIG. 10 shows a flowchart of a method for wireless communications according to an embodiment of the present disclosure.

FIG. 10 shows a flowchart of a method. S1000 for wireless communications according to an embodiment of the present disclosure. The method S1000 starts from step S1002. In step S1004, HARQ feedback values of transmitted transmission data are acquired. In step S1006, a contention window size for carrier sensing performed before next data transmission is adjusted based on the HARQ feedback values. The method S1000 ends at step S1008, and the method S1000 may be performed at the base station side.

The method may be performed, for example, by the electronic apparatus 100 described in the above embodiments. For details, one may refer to the above description, and the details are not repeated here.

The technology of the present disclosure can be applied to various products.

For example, the electronic apparatus 100 may be implemented as various base stations. The base station may be implemented as any type of evolved Node B (eNB) or gNB (5G base station). An eNB includes, for example, macro eNBs and small eNBs. A small eNB may be an eNB that covers a cell smaller than a macro cell, such as a pico eNB, a micro eNB, and a home (femto) eNB. A similar situation can also apply to gNBs. Alternatively, the base station may be implemented as any other type of base station, such as a NodeB and a base transceiver station (BTS). The base station may include: a main body (also referred to as base station equipment) configured to control wireless communications; and one or more remote radio heads (RRHs) arranged at a different place from the main body. In addition, various types of user equipment can all operate as base stations by temporarily or semi-persistently performing base station functions.

The user equipment may be implemented as a mobile terminal (such as a smart phone, a tablet personal computer (PC), a notebook PC, a portable game terminal, a portablel-dongle type mobile router, and a digital camera) or a vehicle-mounted terminal (such as an automobile navigation device). The user equipment may also be implemented as a terminal (also referred to as a machine type communication (MTC) terminal) that executes Machine-to-Machine (M2M) communications. In addition, the user equipment may be a wireless communication module (such as an integrated circuit module including a single chip) installed on each of the above-mentioned terminals.

Application Examples About Base Stalk

First Application Example

Figure 11:
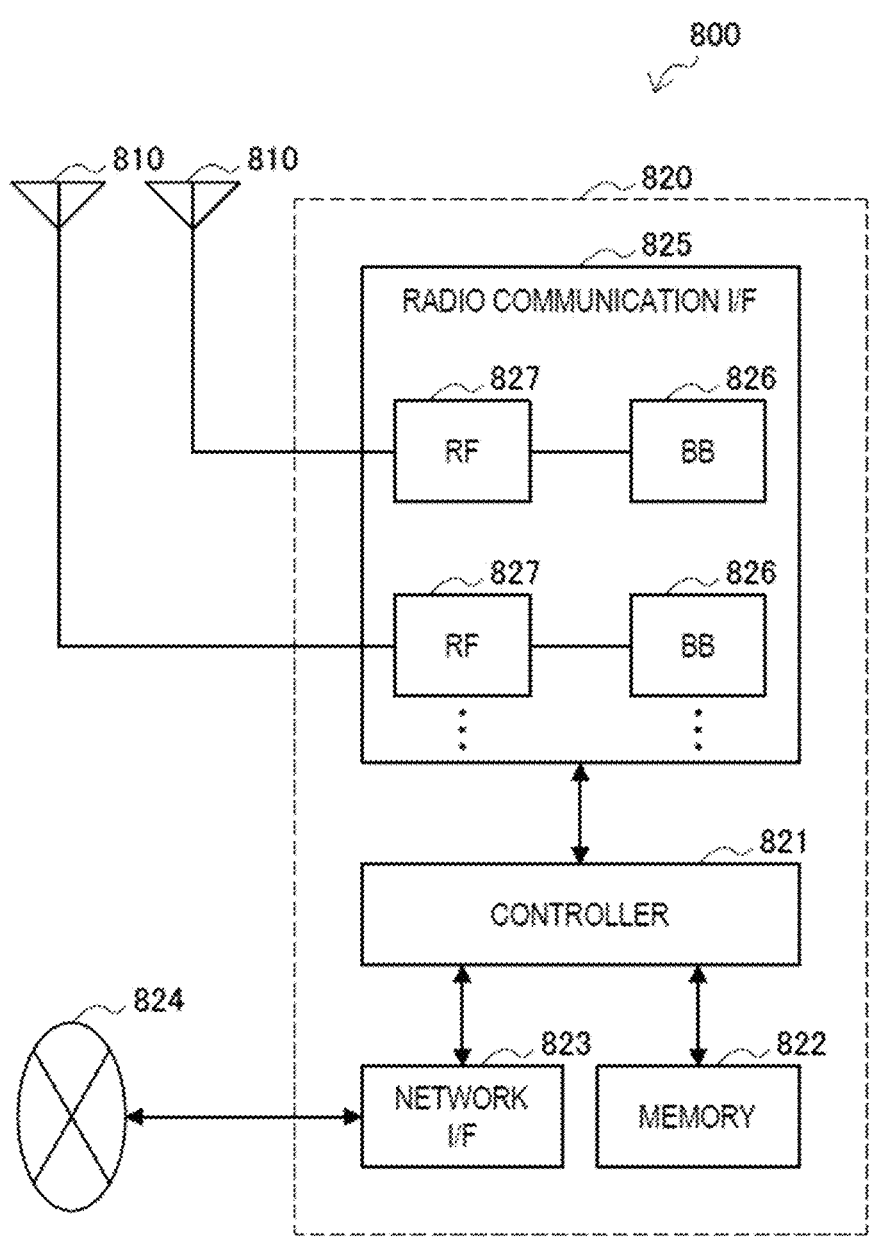
FIG. 11 is a block diagram showing a first example of a schematic configuration of an eNB or gNB to which the technology of the present disclosure can be applied.

FIG. 11 is a block diagram showing a first example of a schematic configuration of an eNB or gNB to which the technology of the present disclosure can be applied. Note that, the following description takes an eNB as an example, but it may also be applied to a gNB. An eNB 800 includes one or more antennas 810 and base station equipment 820. The base station equipment 820 and each antenna 810 may be connected to each other via an RF cable.

Each of the antennas 810 includes a single or multiple antenna elements (such as multiple antenna elements included in a Multi-Input Multi-Output (MIMO) antenna), and is used for the base station equipment 820 to transmit and receive wireless signals. As shown in FIG. 11, the eNB 800 may include multiple antennas 810. For example, the multiple antennas 810 may be compatible with multiple frequency hands used by the eNB 800. Although FIG. 11 shows an example in which the eNB 800 includes multiple antennas 810, the eNB 800 may also include a single antenna 810.

The base station equipment 820 includes a controller 821, a memory 822, a network interface (I/F) 823, and a radio communication interface 825.

The controller 821 may be, for example, a CPU or a DSP, and manipulate various functions of a higher layer of the base station equipment 820. For example, the controller 821 generates a data packet based on data in a signal processed by the radio communication interface 825, and transfers the generated packet via the network interface 823. The controller 821 may bundle data from multiple baseband processors to generate a bundled packet, and transfer the generated bundled packet. The controller 821 may have a logical function for performing control such as radio resource control, radio bearer control, mobility management, admission control, and scheduling. The control may be executed in conjunction with nearby eNBs or core network nodes. The memory 822 includes an RAM and an ROM, and stores programs executed by the controller 821 and various types of control data (such as a terminal list, transmission power data, and scheduling data).

The network interface 823 is a communication interface for connecting the base station equipment 820 to a core network 824. The controller 821 may communicate with the core network node or another eNB via the network interface 823. In this case, the eNB 800 and the core network node or other eNBs may be connected to each other through a logical interface (such as an S1 interface and an X2 interface). The network interface 823 may also be a wired communication interface, or a wireless communication interface for a wireless backhaul line. If the network interface 823 is a wireless communication interface, the network interface 823 may use a higher frequency band for wireless communications than the frequency hand used by the radio communication interface 825.

The radio communication interface 825 supports any cellular communication scheme (such as Long Term Evolution (LTE) and LTE-Advanced), and provides wireless connection to a terminal located in a cell of the eNB 800 via an antenna 810. The radio communication interface 825 may generally include, for example, a baseband (BB) processor 826 and an RF circuit 827. The BB processor 826 may execute, for example, encoding/decoding, modulation/de-modulation, and multiplexing demultiplexing, and execute various types of signal processing of layers (e.g., L1, Medium Access Control (MAC), Radio Link Control (RLC), and Packet Data Convergence Protocol (PDCP)). Instead of the controller 821, the BB processor 826 may have a part or all of the above-mentioned logical functions. The BB processor 826 may be a memory storing a communication control program, or a module including a processor and related circuits configured to execute the program. An update program may cause the function of the BB processor 826 to be changed. The module may be a card or blade inserted into a slot of the base station equipment 820. Alternatively, the module may also be a chip mounted on a card or blade. Meanwhile, the RF circuit 827 may include, for example, a mixer, a filter, and an amplifier, and transmit and receive a wireless signal via the antenna 810.

As shown in FIG. 11, the radio communication interface 825 may include multiple BB processors 826. For example, the multiple BB processors 826 may be compatible with multiple frequency bands used by the eNB 800. As shown in FIG. 11, the radio communication interface 825 may include multiple RF circuits 827. For example, the multiple RF circuits 827 may be compatible with multiple antenna elements. Although FIG. 11 shows an example in which the radio communication interface 825 includes multiple BB processors 826 and multiple RF circuits 827, the radio communication interface 825 may also include a single BB processor 826 or a single RF circuit 827.

In the eNB 800 as shown in FIG. 11, the transceiver of the electronic apparatus 100 described with reference to FIG. 1 may be implemented by a radio communication interface 825. At least part of the function may also be implemented by the controller 821. For example, the controller 821 may adjust the contention window size based on the acquired HARQ feedback values by performing the functions of the first processing unit 102 and the second processing unit 104 described above with reference to FIG. 1.

Second Application Example

Figure 12:
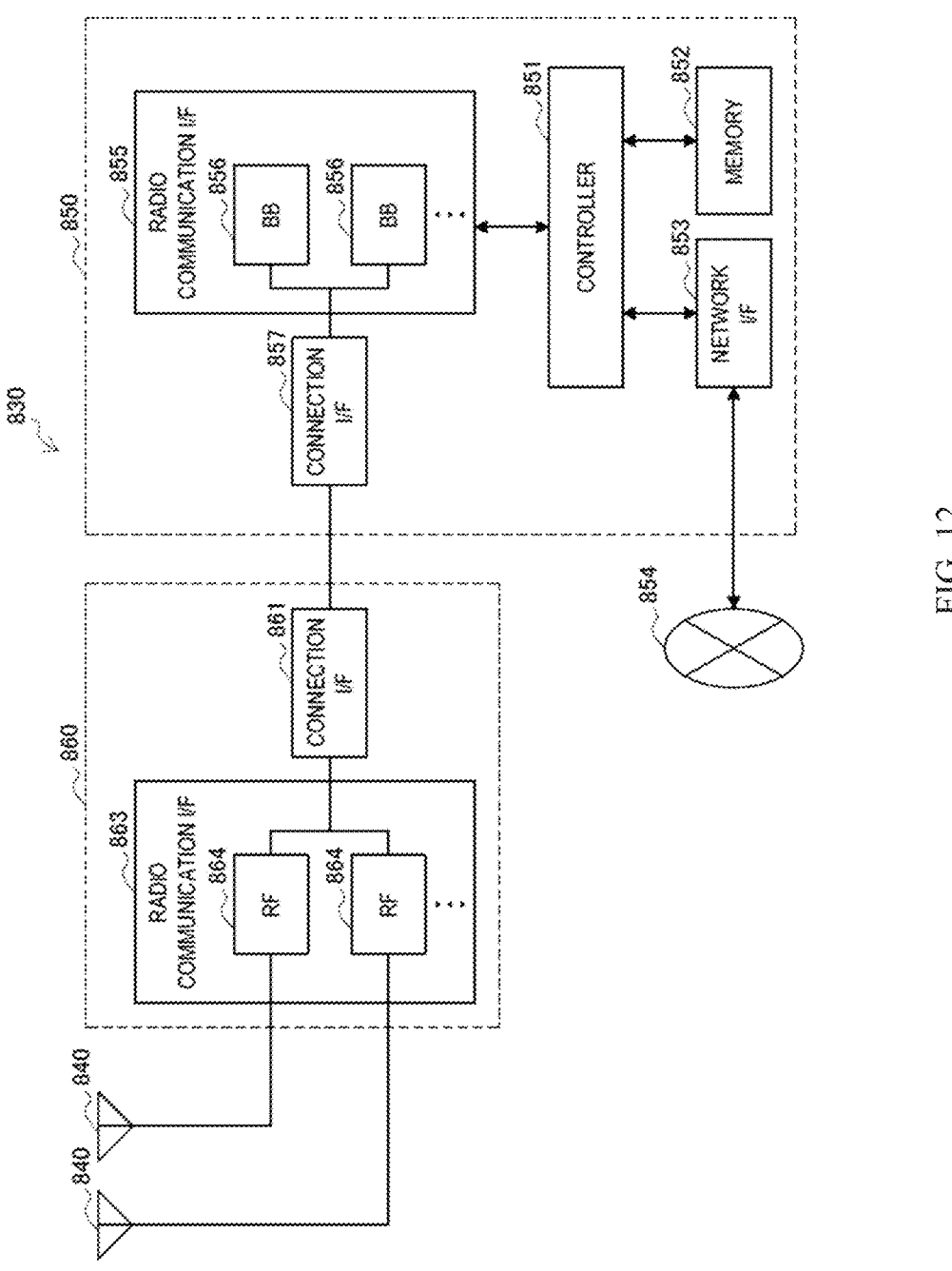
FIG. 12 is a block diagram showing a second example of a schematic configuration of an eNB or gNB to which the technology of the present disclosure can be applied.

FIG. 12 is a block diagram showing a second example of a schematic configuration of an eNB or gNB to which the technology of the present disclosure can be applied. Note that similarly, the following description takes an eNB as an example, but it may also be applied to a gNB. An eNB 830 includes one or more antennas 840, base station equipment 850, and an RRH 860. The RRH 860 and each antenna 840 may be connected to each other via an RF cable. The base station equipment 850 and the RRH 860 may be connected to each other via a high-speed line such as an optical fiber cable.

Each of the antennas 840 includes a single or multiple antenna elements (such as multiple antenna elements included in a MIMO antenna) and is used for the RRH 860 to transmit and receive a wireless signal. As shown in FIG. 12, the eNB 830 may include multiple antennas 840. For example, the multiple antennas 840 may be compatible with multiple frequency bands used by the eNB 830. Although FIG. 12 shows an example in which the eNB 830 includes multiple antennas 840, the eNB 830 may also include a single antenna 840.

The base station equipment 850 includes a controller 851, a memory 852, a network interface 853, a radio communication interface 855, and a connection interface 857. The controller 851, the memory 852, and the network interface 853 are the same as the controller 821, the memory 822, and the network interface 823 as described with reference to FIG. 11.

The radio communication interface 855 supports any cellular communication scheme (such as and LTE-Advanced), and provides wireless communications to a terminal located in a sector corresponding to the RRH 860 via the RRH 860 and the antenna 840. The radio communication interface 855 may generally include, for example, a BB processor 856. The BB processor 856 is the same as the BB processor 826 as described with reference to FIG. 11 except that the BB processor 856 is connected to the RF circuit 864 of the RRH 860 via the connection interface 857. As shown in FIG. 12, the radio communication interface 855 may include multiple BB processors 856. For example, the multiple BB processors 856 may be compatible with multiple frequency bands used by the eNB 830. Although FIG. 12 shows an example in which the radio communication interface 855 includes multiple BB processors 856, the radio communication interface 855 may also include a single BB processor 856.

The connection interface 857 is an interface for connecting the base station equipment 850 (radio communication interface 855) to the RRH 860. The connection interface 857 may also be a communication module for communication in the above-mentioned high-speed line that connects the RRH 860 to the base station equipment 850 (radio communication interface 855).

The RRH 860 includes a connection interface 861 and a radio communication interface 863.

The connection interface 861 is an interface for connecting the RRH 860 (radio communication interface 863) to the base station equipment 850. The connection interface 861 may also be a communication module for communication in the above-mentioned high-speed line.

The radio communication interface 863 transfers and receives wireless signals via the antenna 840. The radio communication interface 863 may generally include, for example, an RF circuit 864. The RF circuit 864 may include, for example, a mixer, a filter, and an amplifier, and transfer and receive wireless signals via the antenna 840. As shown in FIG. 12, the radio communication interface 863 may include multiple RF circuits 864. For example, the multiple RF circuits 864 may support multiple antenna elements. Although FIG. 12 shows an example in which the radio communication interface 863 includes multiple RF circuits 864, the radio communication interface 863 may also include a single RF circuit 864.

In the eNB 830 as shown in FIG. 12, the transceiver of the electronic apparatus 100 described with reference to FIG. 1 may be implemented by the radio communication interface 855. At least part of the function may also be implemented by the controller 851. For example, the controller 851 may adjust the contention window size based on the acquired HARQ feedback values by performing the functions of the first processing unit 102 and the second processing unit 104 described above with reference to FIG. 1.

Application Example About User Equipment

First Application Example

Figure 13:
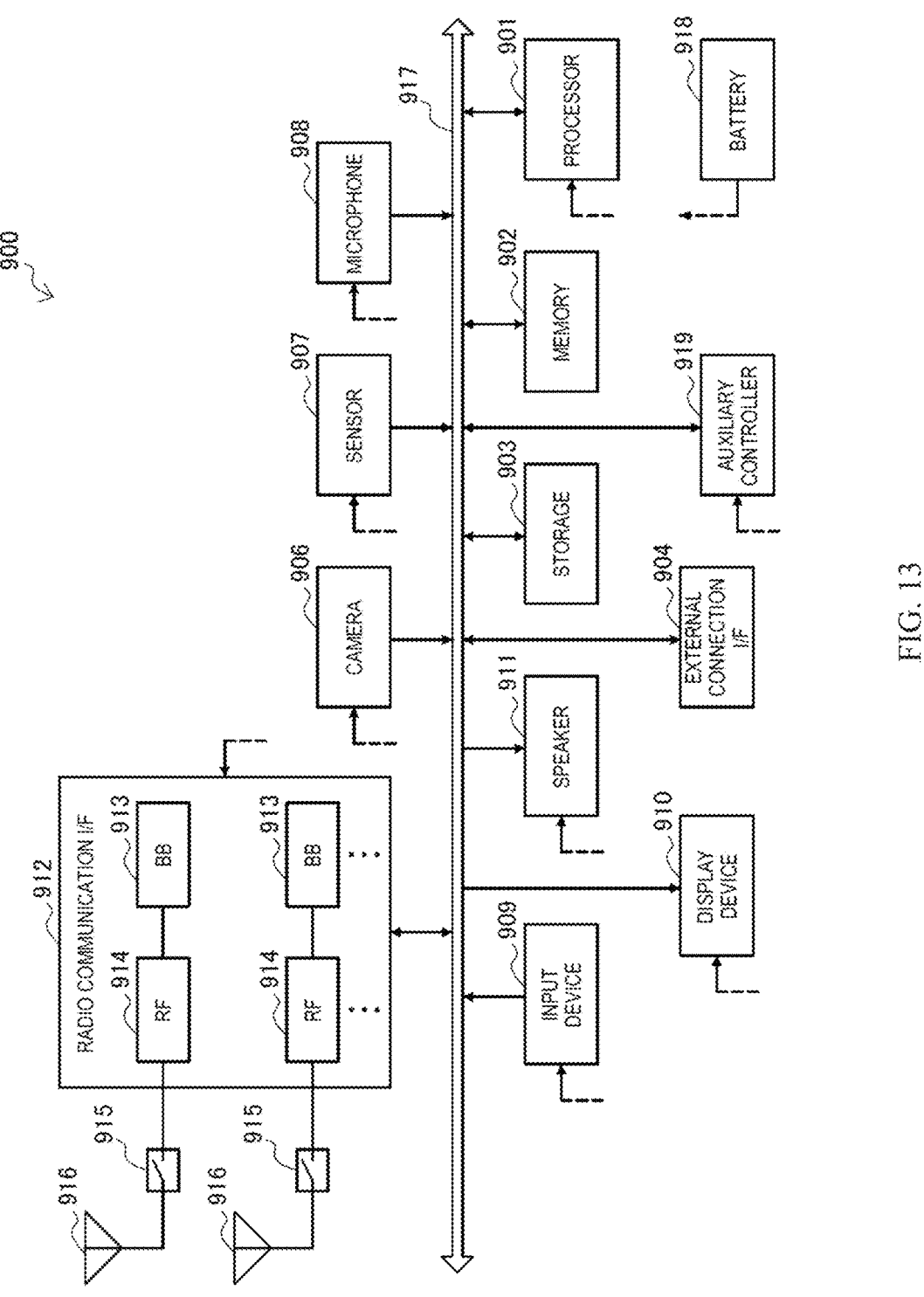
FIG. 13 is a block diagram showing an example of a schematic configuration of a smart phone to which the technology of the present disclosure can be applied.

FIG. 13 is a block diagram showing an example of a schematic configuration of a smart phone to which the technology of the present disclosure can be applied. The smart phone 900 includes a processor 901, a memory 902, a storage 903, an external connection interface 904, an camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls the functions of the application layer and other layers of the smart phone 900. The memory 902 includes an RAM and an ROM, and stores data and programs executed by the processor 901. The storage 903 may include a storage medium such as a semiconductor memory and a hard disk. The external connection interface 904 is an interface for connecting an external device (such as a memory card and a universal serial bus (USB) device) to the smart phone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetic sensor, and an acceleration sensor The microphone 908 converts sound input to the smart phone 900 into an audio signal. The input device 909 includes, for example, a touch sensor, a keypad, a keyboard, a button, or a switch configured to detect a touch on a screen of the display device 910, and receives an operation or information input from the user. The display device 910 includes a screen (such as a liquid crystal display (LCD) and an organic light emitting diode (OLED) display), and displays an output image of the smart phone 900. The speaker 911 converts the audio signal output from the smart phone 900 into soun.

The radio communication interface 912 supports any cellular communication scheme (such as LIE and LIE-Advanced), and executes wireless communications. The radio communication interface 912 may generally include, for example, a BB processor 913 and an RF circuit 914. The BB processor 913 may execute, for example, encoding/decoding, modulation/demodulation, and multiplexing/demultiplexing, and execute various types of signal processing for wireless communications. Meanwhile, the RF circuit 914 may include, for example, a mixer, a filter, and an amplifier, and transmit and receive wireless signals via the antenna 916. Note that, although the figure shows a circumstance where one RF link is connected with one antenna, this is only schematic, and a circumstance where one RF link is connected with multiple antennas through multiple phase shifters is also included. The radio communication interface 912 may be a chip module on which the BB processor 913 and the RF circuit 914 are integrated. As shown in FIG. 13, the radio communication interface 912 may include multiple BB processors 913 and multiple RF circuits 914. Although FIG. 13 shows an example in which the radio communication interface 912 includes multiple BB processors 913 and multiple RF circuits 914, the radio communication interface 912 may also include a single BB processor 913 or a single RF circuit 914.

Furthermore, in addition to the cellular communication scheme, the radio communication interface 912 may support other types of wireless communication schemes, such as a short-range wireless communication scheme, a near field communication scheme, and a wireless local area network (LAN) scheme. In this case, the radio communication interface 912 may include a BB processor 913 and an RF circuit 914 for each wireless communication scheme.

Each of the antenna switches 915 switches a connection destination of the antenna 916 among multiple circuits included in the radio communication interface 912 (e.g., circuits for different wireless communication schemes).

Each of the antennas 916 includes a single or multiple antenna elements (such as multiple antenna elements included in a MIMO antenna), and is used for the radio communication interface 912 to transmit and receive wireless signals. As shown in FIG. 13, the smart phone 900 may include multiple antennas 916. Although FIG. 13 shows an example in which the smart phone 900 includes multiple antennas 916, the smart phone 900 may also include a single antenna 916.

Furthermore, the smart phone 900 may include an antenna 916 fix each wireless communication scheme. In this case, the antenna switch 915 may be omitted from the configuration of the smart phone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to each block of the smart phone 900 as shown in FIG. 13 via a feeder line, which is partially shown as a dashed line in the figure. The auxiliary controller 919 manipulates the least necessary function of the smart phone 900 in a sleep mode, for example.

Second Application Example

Figure 14:
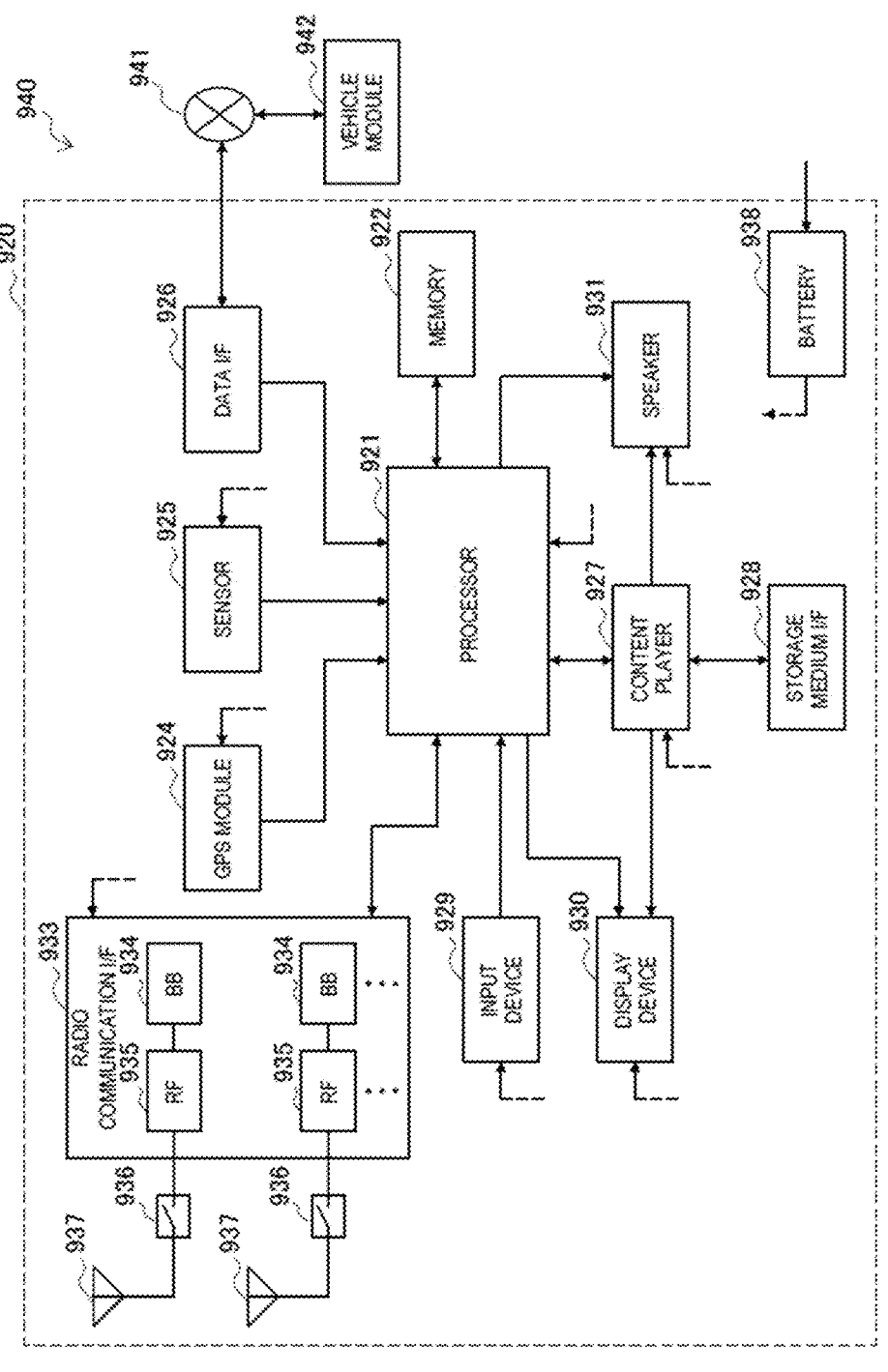
FIG. 14 is a block diagram showing an example of a schematic configuration of automobile navigation equipment to which the technology of the present disclosure can be applied.

FIG. 14 is a block diagram showing an example of a schematic configuration of automobile navigation equipment to which the technology of the present disclosure can be applied. The automobile navigation equipment 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls the navigation function of the automobile navigation equipment 920 and additional functions. The memory 922 includes an RAM and an ROM, and stores data and programs executed by the processor 921.

The GPS module 924 uses a GPS signal received from a GPS satellite to measure a position of the automobile navigation equipment 920 (such as latitude, longitude, and altitude). The sensor 925 may include a group of sensors, such as a gyro sensor, a geomagnetic sensor, and an air pressure sensor. The data interface 926 is connected to, for example, an in-vehicle network 941 via a terminal not shown, and acquires data (such as vehicle speed data) generated by a vehicle.

The content player 927 reproduces content stored in a storage medium (such as a CD and a DVD), which is inserted into the storage medium interface 928. The input device 929 includes, for example, a touch sensor, a button, or a switch configured to detect a touch on a, screen of the display device 930, and receives an operation or information input from the user. The display device 930 includes a screen such as an LCD or OLED display, and displays an image of a navigation function or reproduced content. The speaker 931 outputs the sound of the navigation function or the reproduced content.

The radio communication interface 933 supports any cellular communication scheme, such as LIE and LTE-Advanced, and executes wireless communication. The radio communication interface 933 may generally include, for example, a BB processor 934 and an RF circuit 935. The BB processor 934 may execute, for example, encoding/decoding, modulation/demodulation, and multiplexing/demultiplexing, and execute various types of signal processing for wireless communications. Meanwhile, the RF circuit 935 may include, for example, a mixer, a filter, and an amplifier, and transmit and receive wireless signals via the antenna 937. The radio communication interface 933 may also be a chip module on which the BB processor 934 and the RF circuit 935 are integrated. As shown in FIG. 14, the radio communication interface 933 may include multiple BB processors 934 and multiple RF circuits 935. Although FIG. 14 shows an example in which the radio communication interface 933 includes multiple BB processors 934 and multiple circuits 935, the radio communication interface 933 may also include a single BB processor 934 or a single RF circuit 935.

Furthermore, in addition to the cellular communication scheme, the radio communication interface 933 may support types of wireless communication schemes, such as a short-range wireless communication scheme, a near field communication scheme, and a wireless LAN scheme. In this case, the radio communication interface 933 may include a BB processor 934 and an RF circuit 935 for each wireless communication scheme.

Each of the antenna switches 936 switches a connection destination of the antenna 937 among multiple circuits included in the radio communication interface 933 (e.g., circuits for different wireless communication schemes).

Each of the antennas 937 includes a single or multiple antenna elements (such as multiple antenna elements included in a MIMO antenna), and is used for the radio communication interface 933 to transmit and receive wireless signals. As shown in FIG. 14, the automobile navigation equipment 920 may include multiple antennas 937. Although FIG. 14 shows an example in which the automobile navigation equipment 920 includes multiple antennas 937, the automobile navigation equipment 920 may also include a single antenna 937.

Furthermore, the automobile navigation equipment 920 may include an antenna 937 for each wireless communication scheme. In this case, the antenna switch 936 may be omitted from the configuration of the automobile navigation equipment 920.

The battery 938 supplies power to each block of the automobile navigation equipment 920 as shown in FIG. 14 via a feeder line, which is partially shown as a dashed line in the figure. The battery 938 accumulates electric power supplied from the vehicle.

The technology of the present disclosure may also be implemented as an in-vehicle system (or vehicle) 940 including one or more blocks in the automobile navigation equipment 920, the in-vehicle network 941, and the vehicle module 942. The vehicle module 942 generates vehicle data (such as vehicle speed, engine speed, and failure information), and outputs the generated data to the in-vehicle network 941.

The basic principle of the present invention has been described above in conjunction with specific embodiments. However, it should be pointed out that, for those skilled in the art, it could be understood that all or any step or component of the methods and devices of the present invention may be implemented in any computing device (including processors, storage media, etc.) or network of computing devices in the form of hardware, firmware, software, or a combination thereof. This can be achieved by those skilled in the art utilizing their basic circuit design knowledge or basic programming skills after reading the description of the present invention.

Moreover, the present invention also proposes a program product storing a machine-readable instruction code that, when read and executed by a machine, can execute the above-mentioned methods according to the embodiments of the present invention.

Accordingly, a storage medium for carrying the above-mentioned program product storing a machine-readable instruction code is also included in the disclosure of the present invention. The storage medium includes, but is not limited to, a floppy disk, an optical disk, a magneto-optical disk, a memory card, a memory stick, etc.

Figure 15:
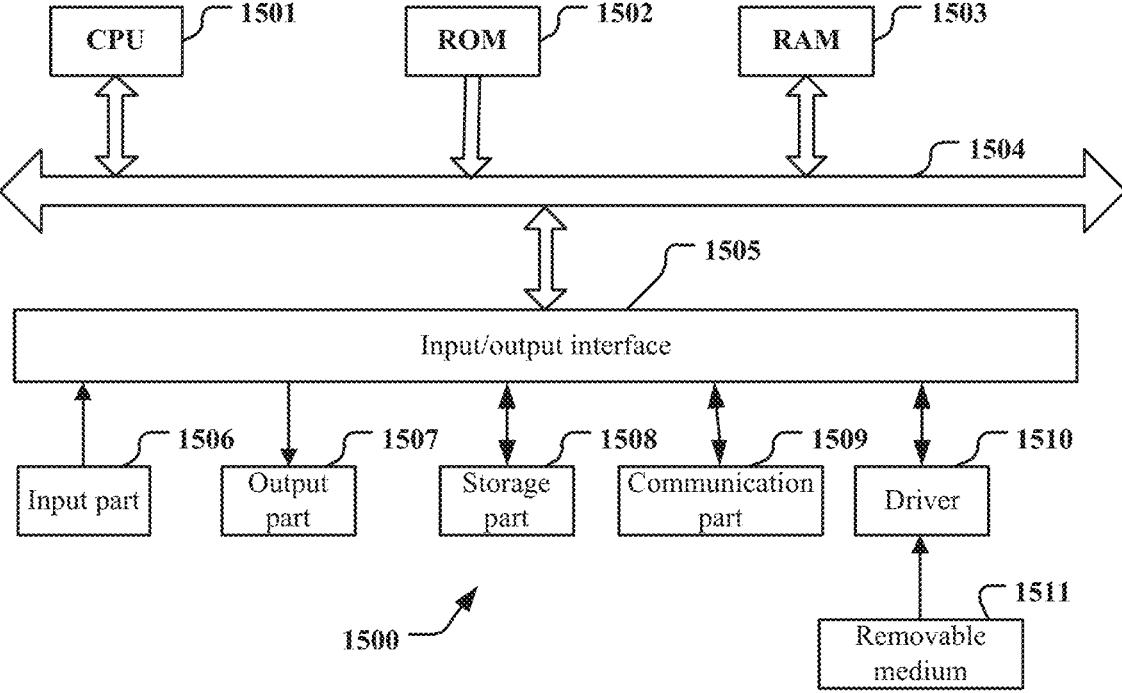
FIG. 15 is a block diagram of an exemplary structure of a personal computer that can be applied to the embodiments of the present disclosure.

In a case where the present invention is implemented by software or firmware, a program constituting the software is installed from a storage medium or a network to a computer with a dedicated hardware structure (e.g., a general-purpose computer 1500 as shown in FIG. 15), and the computer, when installed with various programs, can execute various functions and the like.

In FIG. 15, a central processing unit (CPU) 1501 executes various processing in accordance with a program stored in a read only memory (ROM) 1502 or a program loaded from a storage part 1508 to a random access memory (RAM) 1503. In the RAM 1503, data required when the CPU 1501 executes various processing and the like is also stored as needed. The CPU 1501, the ROM 1502, and the RAM 1503 are connected to each other via a bus 1504. The input/output interface 1505 is also connected to the bus 1504.

The following components are connected to the input/output interface 1505: an input part 1506 (including a keyboard, a mouse, etc.), an output part 1507 (including a display, such as a cathode ray tube (CRT), a liquid crystal display (LCD), etc., and a speaker, etc.), a storage part 1508 (including a hard disk, etc.), and a communication part 1509 (including a network interface card such as an LAN card, a modem, etc.). The communication part 1509 executes communication processing via a network such as the Internet. The driver 1510 may also be connected to the input/output interface 1505, as needed. A removable medium 1511 such as a magnetic disk, an optical disk, a magneto-optical disk, a semiconductor memory and the like is installed on the driver 1510 as needed, so that a computer program read out therefrom is installed into the storage part 1508 as needed.

In a case where the above-mentioned series of processing is implemented by software, a program constituting the software is installed from a network such as the Internet or a storage medium such as the removable medium 1511.

Those skilled in the art should understand that, this storage medium is not limited to the removable medium 1511 as shown in FIG. 15 which has a program stored therein and which is distributed separately from an apparatus to provide the program to users. Examples of the removable media 1511 include magnetic disks (including a floppy disk (registered trademark)), an optical disk (including a compact disk read-only memory (CD-ROM) and a digital versatile disk (DVD)), a magneto-optical disk (including a mini disk (MD) (registered trademark)), and a semiconductor memory. Alternatively, the storage medium may be the ROM 1502, a hard disk included in the storage part 1508, etc., which have programs stored therein and which are distributed concurrently with the apparatus including them to users.

It should also be pointed out that in the devices, methods and systems of the present invention, each component or each step may be decomposed and/or recombined. These decompositions and/or recombinations should be regarded as equivalent solutions of the present invention. Moreover, the steps of executing the above-mentioned series of processing may naturally be executed in chronological order in the order as described, but do not necessarily need to be executed in chronological order. Some steps may be executed in parallel or independently of each other.

Finally, it should be noted that, the terms "include", "comprise" or any other variants thereof are intended to cover non-exclusive inclusion, so that a process, method, article or apparatus that includes a series of elements not only includes those elements, but also includes other elements that are not explicitly listed, or but also includes elements inherent to such a process, method, article, or apparatus. Furthermore, in the absence of more restrictions, an element defined by sentence "including one . . . " does not exclude the existence of other identical elements in a process, method, article, or apparatus that includes the element.

Although the embodiments of the present invention have been described above in detail in conjunction with the accompanying drawings, it should be appreciated that, the above-described embodiments are only used to illustrate the present invention and do not constitute a limitation to the present invention. For those skilled in the art, various modifications and changes may be made to the above-mentioned embodiments without departing from the essence and scope of the present invention. Therefore, the scope of the present invention is defined only by the appended claims and equivalent meanings thereof.

This technology may also be implemented as follows.

Note 1. An electronic apparatus for wireless communications, including a processing circuit configured to:

acquire hybrid automatic repeat request, HARQ, feedback values of transmitted transmission data; and adjust, based on the HARQ feedback values, a contention window size, CWS, for carrier sensing performed before next data transmission.

Note 2. The electronic apparatus according to note 1, wherein the processing circuit is configured to adjust the CWS further based on a determination result obtained by determining whether there is a hidden node.

Note 3. The electronic apparatus according to note 2, wherein the processing circuit is configured to determine, based on the HARQ feedback values of at least part of non-reference data transmitted within a channel occupation time COT, whether there is the hidden node, wherein the non-reference data is data transmitted within each duration in the COT other than a first duration serving as a reference duration.

Note 4. The electronic apparatus according to note 3, wherein the processing circuit is configured to determine, in a case that the HARQ feedback values of all non-reference data transmitted in the COT are NACK, that there is the hidden node, and otherwise determine that there is no hidden node.

Note 5. The electronic apparatus according to note 3, wherein the processing circuit is configured to determine, in a case that a ratio of the number of HARQ feedback values that are NACK among all HARQ feedback values of the non-reference data transmitted in the COT to a total number of all HARQ feedback values is greater than or equal to a predetermined ratio threshold, that there is the hidden node, and otherwise determine that there is no hidden node.

Note 6. The electronic apparatus according to note 3, wherein the processing circuit is configured to determine, in a case that HARQ feedback values of non-reference data first transmitted in time among the non-reference data transmitted in the COT are ACK, that there is no hidden node, and otherwise determine that there is the hidden node.

Note 7. The electronic apparatus according to note 3, wherein the processing circuit is configured to determine, in a case that HARQ feedback values of non-reference data last transmitted in time among the non-reference data transmitted in the COT are ACK, that there is no hidden node, and otherwise determine that there is the hidden node.

Note 8. The electronic apparatus according to note 3, wherein the processing circuit is configured to determine, in a case that there is at least one ACK in the HARQ feedback values of the non-reference data transmitted in the COT, that there is no hidden node, and otherwise determine that there is the hidden node.

Note 9. The electronic apparatus according to any one of notes 3 to 8, wherein the processing circuit is configured to adjust the CWS further based on the HARQ feedback values of reference data, wherein the reference data is data transmitted within the reference duration in the COT among the transmission data.

Note 10. The electronic apparatus according to note 9, wherein the processing circuit is configured to set the CWS to be a predetermined CWS minimum in a case that the HARQ feedback values of the reference data are ACK.

Note 11. The electronic apparatus according to note 9, wherein the processing circuit is configured to update the CWS in a case that the HARQ feedback values of the reference data are NACK and it is determined that there is no hidden node.

Note 12. The electronic apparatus according to note 9, wherein the processing circuit is configured to adjust, in a case that the HARQ feedback values of the reference data are NACK and it is determined that there is the hidden node, the CWS based on the number of times of maintaining the CWS at a predetermined CWS maximum.

Note 13. The electronic apparatus according to note 12, wherein the CWS is updated in a case that the number of times is less than or equal to a number of times threshold obtained based on a predetermined number of times of maintaining the CWS at the CWS maximum, and otherwise the CWS is maintained, wherein in a case of maintaining the CWS at the CWS maximum for the predetermined number of times, the CWS is reset to be a predetermined CWS minimum.

Note 14. The electronic apparatus according to note 13, wherein the processing circuit is configured to select the predetermined number of times for each channel access priority.

Note 15. The electronic apparatus according to note 13 or 14, wherein the number of times threshold is obtained based on a square of the predetermined number of times.

Note 16. The electronic apparatus according to note 2, wherein the processing circuit is configured to determine whether there is the hidden node based on the HARQ feedback values of reference data and information about a channel between the electronic apparatus and a user equipment received from the user equipment, wherein the reference data is data transmitted within a first duration serving as a reference duration in a channel occupation time among the transmission data.

Note 17. The electronic apparatus according to note 16, wherein the information about the channel is received together with the HARQ feedback values or is received through the HARQ feedback values.

Note 18. The electronic apparatus according to note 16 or 17, wherein the information of the channel is an energy detection threshold.

Note 19. The electronic apparatus according to note 18, wherein the processing circuit is configured to determine that there is no hidden node and update the CWS in a case that the energy detection threshold is less than or equal to a predetermined energy detection threshold and the HARQ feedback values of the reference data are NACK.

Note 20. The electronic apparatus according to note 19, wherein the processing circuit is configured to determine that there is the hidden node and maintain the CWS in a case that the energy detection threshold is greater than the predetermined energy detection threshold and the HARQ feedback values of the reference data are NACK.

Note 21. The electronic apparatus according to note 2, wherein the processing circuit is configured to transmit the transmission data in unit of a code block, and the processing circuit is configured to acquire a first ratio and a second ratio, and determine whether there is the hidden node based on a change rate of the second ratio with respect to the first ratio, wherein the first ratio is a ratio of NACK in first HARQ feedback values that correspond to a case where the code block is initially transmitted, and the second ratio is a ratio of NACK in second HARQ feedback values that correspond to a case where the code block is retransmitted.

Note 22. The electronic apparatus according to note 21, wherein the processing circuit is configured to determine that there is the hidden node and maintain the CWS in a case that the change rate is less than or equal to a predetermined change rate, and otherwise determine that there is no hidden node and update the CWS.

Note 23. The electronic apparatus according to note 21 or 22, wherein the processing circuit is configured to take, in a case that the first HARQ feedback values and the second HARQ feedback values are within a same channel occupation time, HARQ feedback values corresponding to a case where other code blocks are not transmitted together with the retransmitted code block when retransmitting the code block as the second HARQ feedback values.

Note 24. The electronic apparatus according to note 21 or 22, wherein the processing circuit is configured to take, in a case that the first HARQ feedback values and the second HARQ feedback values are within a same channel occupation time, HARQ feedback values corresponding to a case where other code blocks are transmitted together with the retransmitted code block when retransmitting the code block as the second HARQ feedback values.

Note 25. The electronic apparatus according to note 21 or 22, wherein the processing circuit is configured to take, in a case that the first HARQ feedback values and the second HARQ feedback values are not within a same channel occupation time, HARQ feedback values corresponding to a case where other code blocks are transmitted together with the retransmitted code block when retransmitting the code block as the second HARQ feedback values.

Note 26. The electronic apparatus according to any one of notes 1 to 25, the processing circuit is configured to transmit the transmission data on an unauthorized frequency band.

Note 27. An electronic apparatus for wireless communications, including a processing circuit configured to:
determine a contention window size, CWS, for carrier sensing performed before next data transmission based on a block error rate of transmitted data.

Note 28. The electronic apparatus according to note 27, wherein the processing circuit is configured to determine the CWS based on a predetermined correspondence between the block error rate and the value set of the CWS.

Note 29. The electronic apparatus according to note 28, wherein in the correspondence, a great block error rate corresponds to a great CWS in a value set corresponding to the block error rate.

Note 30. The electronic apparatus according to note 29, wherein the value set corresponding to the block error rate is characterized by a charnel access priority, and a great block error rate corresponds to a low channel access priority.

Note 31. The electronic apparatus according to any one of note 28 or 29, the CWS is randomly selected from the value set corresponding to the block error rate.

Note 32. A method for wireless communications, including:
acquiring hybrid automatic repeat request, HARQ, feedback values of transmitted transmission data; and
adjusting, based on the HARQ feedback values, a contention window size CWS for carrier sensing per before next data transmission.

Note 33. A computer-readable storage medium having computer-executable instructions stored thereon, wherein the computer-executable instructions, when being executed, cause the method for wireless communications according to note 32 to be performed.

The invention claimed is:

1. An electronic apparatus for wireless communications, comprising:
a processing circuit configured to:
transmit data;
acquire hybrid automatic repeat request (HARQ) feedback values of the transmitted data; and
based on the HARQ feedback values, adjust a contention window size (CWS), and perform carrier sensing based on the CWS before a next data transmission,
wherein the processing circuit is further configured to:
adjust the CWS based on a determination result obtained based on the HARQ feedback values, and
determine whether there is another node based on HARQ feedback values of reference data and information about a channel between the electronic apparatus and a user equipment that is received from the user equipment,
wherein the reference data is transmitted within a first duration serving as a reference duration in a channel occupancy time (COT) among the transmitted data.

2. The electronic apparatus according to claim 1, wherein the information about the channel is received together with the HARQ feedback values or is received through the HARQ feedback values, and
wherein the information of the channel is an energy detection threshold.

3. The electronic apparatus according to claim 2, wherein the processing circuit is configured to determine that there is the other node and update the CWS in a case that the energy detection threshold is less than or equal to a predetermined energy detection threshold and the HARQ feedback values of the reference data are NACK, and
wherein the processing circuit is configured to determine that there is the other node and maintain the CWS in a case that the energy detection threshold is greater than the predetermined energy detection threshold and the HARQ feedback values of the reference data are NACK.

4. The electronic apparatus according to claim 1, the processing circuit is configured to transmit the data on an unauthorized frequency band.

5. The electronic apparatus according to claim 1, wherein the detemination result obtained based on the HARQ feedback values is an indication whether there is the another node, and the determination result based on the HARQ feedback values is determined based on one of a first scenario, a second scenario or a third scenario,
wherein in the first scenario, the processing circuit is configured to determine whether there is the another node based on HARQ feedback values of at least part of non-reference data transmitted within a channel occupation time (COT), wherein the non-reference data is data transmitted within each duration in the COT other than a first duration serving as a reference duration,
wherein in the second scenario, the processing circuit is configured to determine whether there is the another node based on HARQ feedback values of reference data and information about a channel between the electronic apparatus and a user equipment that is received from the user equipment, wherein the reference data is transmitted by the user equipment within a first duration serving as a reference duration in a channel occupation time (COT) among the transmitted data, and wherein in the third scenario, the processing circuit is configured determine whether there is the another node based on a change rate of a second ratio with respect to a first ratio, wherein the processing circuit is configured to transmit the data in unit of a code block, wherein the first ratio is a ratio of NACK in first HARQ feedback values that correspond to a case where the code block is initially transmitted, and the second ratio is a ratio of NACK in second HARQ feedback values that correspond to a case where the code block is retransmitted.

6. The electronic apparatus according to claim 5, wherein, in the first scenario, the processing circuit is configured to:

determine, in a case that the HARQ feedback values of all non-reference data transmitted in the COT are NACK, that there is the another node, and otherwise determine that there is no another node, or determine, in a case that a ratio of the number of HARQ feedback values that are NACK among all HARQ feedback values of the non-reference data transmitted in the COT to a total number of all HARQ feedback values is greater than or equal to a predetermined ratio threshold, that there is the another node, and otherwise determine that there is no another node, or determine, in a case that HARQ feedback values of non-reference data first transmitted in time among the non-reference data transmitted in the COT are ACK, that there is no another node, and otherwise determine that there is the another node, or determine, in a case that HARQ feedback values of non-reference data last transmitted in time among the non-reference data transmitted in the COT are ACK, that there is no another node, and otherwise determine that there is the another node, or determine, in a case that there is at least one ACK in the HARQ feedback values of the non-reference data transmitted in the COT, that there is no another node, and otherwise determine that there is the another node.

7. The electronic apparatus according to claim 5, wherein, in the first scenario, the processing circuit is configured to adjust the CWS further based on the HARQ feedback values of reference data, wherein the reference data is transmitted within the reference duration in the COT among the transmitted data.

8. The electronic apparatus according to claim 7, wherein the processing circuit is configured to set the CWS to be a predetermined CWS minimum in a case that the HARQ feedback values of the reference data are ACK, or wherein the processing circuit is configured to update the CWS in a case that the HARQ feedback values of the reference data are NACK and it is determined that there is no another node.

9. The electronic apparatus according to claim 7, wherein the processing circuit is configured to adjust, in a case that the HARQ feedback values of the reference data are NACK and it is determined that there is the another node, the CWS based on the number of times of maintaining the CWS at a predetermined CWS maximum.

10. The electronic apparatus according to claim 9, wherein the CWS is updated in a case that the number of times is less than or equal to a number of times threshold obtained based on a predetermined number of times of maintaining the CWS at the CWS maximum, and otherwise the CWS is maintained, wherein in a case of maintaining the CWS at the CWS maximum for the predetermined number of times, the CWS is reset to be a predetermined CWS minimum.

11. The electronic apparatus according to claim 10, wherein the processing circuit is configured to select the predetermined number of times for each channel access priority, and wherein the number of times threshold is obtained based on a square of the predetermined number of times.

12. The electronic apparatus according to claim 5, wherein, in the third scenario, the processing circuit is configured to determine that there is the another node and maintain the CWS in a case that the change rate is less than or equal to a predetermined change rate, and otherwise determine that there is no another node and update the CWS.

13. The electronic apparatus according to claim 5, wherein, in the third scenario, the processing circuit is configured to:

take, in a case that the first HARQ feedback values and the second HARQ feedback values are within a same channel occupation time, HARQ feedback values corresponding to a case where other code blocks are not transmitted together with the retransmitted code block when retransmitting the code block as the second HARQ feedback values, or take, in a case that the first HARQ feedback values and the second HARQ feedback values are within a same channel occupation time, HARQ feedback values corresponding to a case where other code blocks are transmitted together with the retransmitted code block when retransmitting the code block as the second HARQ feedback values, or take, in a case that the first HARQ feedback values and the second HARQ feedback values are not within a same channel occupation time, HARQ feedback values corresponding to a case where other code blocks are transmitted together with the retransmitted code block when retransmitting the code block as the second HARQ feedback values.

14. The electronic apparatus according to claim 5, wherein, in the second scenario, the information about the channel is received together with the HARQ feedback values or is received through the HARQ feedback values, and wherein the information of the channel is an energy detection threshold.

15. The electronic apparatus according to claim 14, wherein the processing circuit is configured to determine that there is no another node and update the CWS in a case that the energy detection threshold is less than or equal to a predetermined energy detection threshold and the HARQ feedback values of the reference data are NACK, and wherein the processing circuit is configured to determine that there is the another node and maintain the CWS in a case that the energy detection threshold is greater than the predetermined energy detection threshold and the HARQ feedback values of the reference data are NACK.

16. A method for wireless communications by an electronic apparatus, the method comprising:

transmitting data;

acquiring hybrid automatic repeat request (HARQ) feedback values of the transmitted data; and adjusting, based on the HARQ feedback values, a contention window size (CWS), and performing carrier sensing based on the CWS before a next data transmission, wherein the method further comprises:

adjusting the CWS based on a determination result based on the HARQ feedback values, and determining whether there is another node based on HARQ feedback values of reference data and information about a channel between the electronic apparatus and a user equipment that is received from the user equipment, wherein the reference data is transmitted within a first duration serving as a reference duration in a channel occupancy time (COT) among the transmitted data.

* * * * *